United States Patent [19]

Breuner

[11] 3,879,153
[45] Apr. 22, 1975

[54] ATTACHMENT FOR ROTOR HUB AND PAIRS OF BLADES

[76] Inventor: Gerald L. Breuner, 50 Melody Ln., Orinda, Calif. 94563

[22] Filed: Jan. 7, 1974

[21] Appl. No.: 431,382

[52] U.S. Cl............................ 416/141; 416/138
[51] Int. Cl............................................ B64c 27/38
[58] Field of Search ............ 416/135, 136, 138, 141

[56] References Cited
UNITED STATES PATENTS

| | | | |
|---|---|---|---|
| 1,910,622 | 5/1933 | McGuire | 416/135 |
| 3,384,185 | 8/1974 | Fernandez | 416/141 UX |
| 3,470,962 | 10/1969 | Cure | 416/141 |
| 3,578,877 | 5/1971 | Mautz | 416/134 |
| 3,667,863 | 6/1972 | Breuner | 416/138 |
| 3,669,566 | 6/1972 | Bourquardez et al. | 416/141 X |

*Primary Examiner*—Everette A. Powell, Jr.

[57] ABSTRACT

This invention relates to an improved attachment for a rotary wing aircraft having opposed pairs of rotor blades about a central rotor hub in which diametrically extending pairs of cables are supported on the hub and have their ends interconnect the rotor blades and act as hinges therefore and balance the radial load on the cables between associated blades. A rigid member, rotatable in a hub fixture, connects the hub to each rotor blade and acts as a pitch change tube and droop stop. A transverse pivot in this member at the blade connector also allows for lead-lag movement.

7 Claims, 3 Drawing Figures

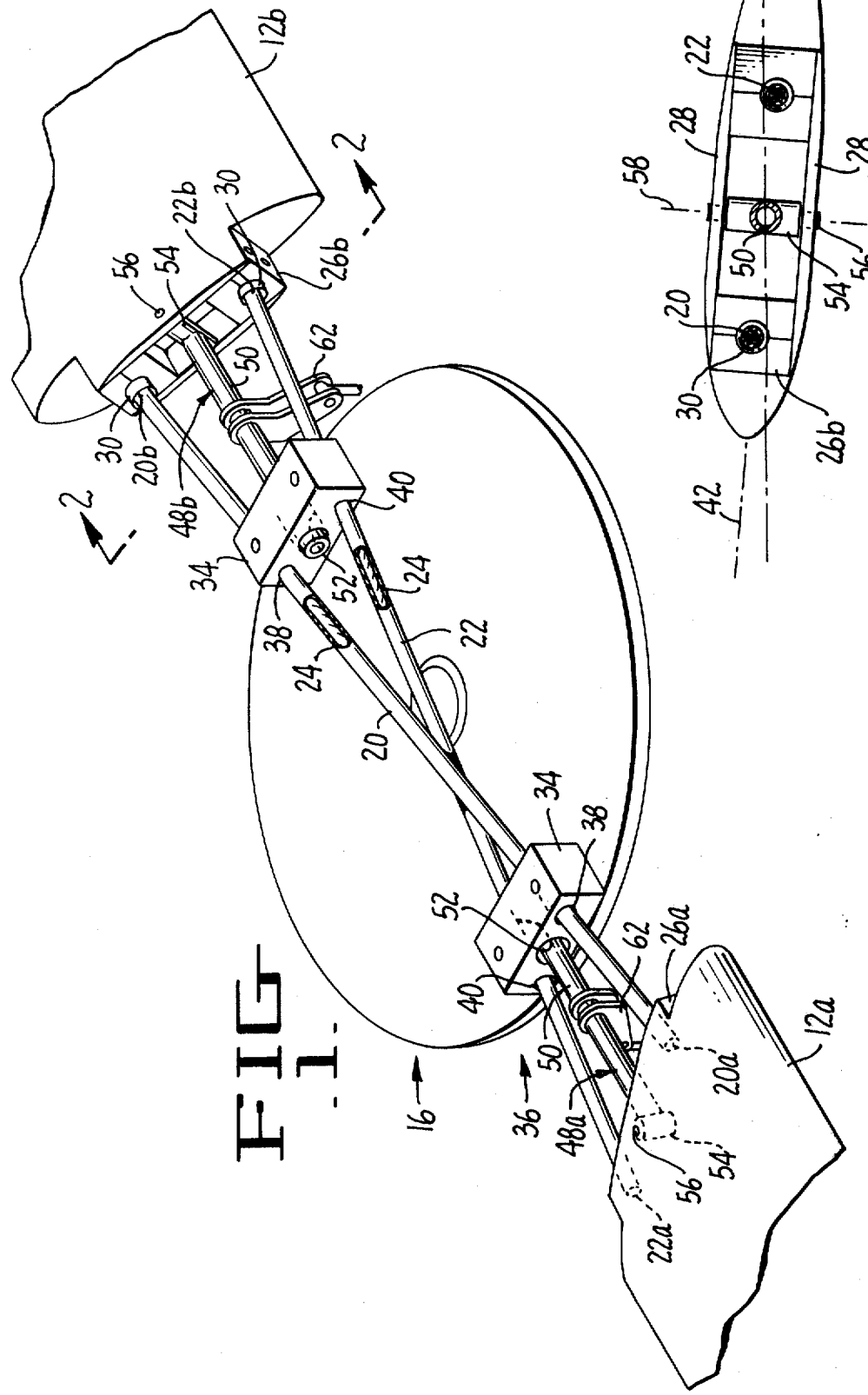

3,879,153

ATTACHMENT FOR ROTOR HUB AND PAIRS OF BLADES

BACKGROUND OF THE INVENTION

This is an improvement on the structure shown on my issued patent for Rotor Hub and Blade Attachments, U.S. Pat. No. 3,667,863. As shown therein a series of cables are used in place of normal solid hinges to provide movement between the hub and blade. With the cables, a number of anchoring fixtures and swagged connectors were provided for connecting the blade to the hub. These fixtures and connectors add weight and it is with the desire to reduce this weight that this invention is concerned. Numerous advantages are inherent in the particular structure disclosed.

SUMMARY OF THE INVENTION

In the aforementioned patent, each blade to hub connection was of discrete form; that is, a single connection structure and mechanism was provided for each blade. Where an even number of rotor blades are provided, an advantage may be gained by extending the cables from one rotor blade, across the rotor hub and fastening the cable ends to the opposed rotor blade. This allows the elimination of two swagged end fittings per blade, thus, both reducing cost and weight.

It is therefore a principal object of the present invention to provide an improved attachment means for rotary wing aircraft having an equal number of rotor blades about a central rotor hub in which opposed pairs of blades have associated attachment means.

It is another object to provide such attachment means which balance the radial load of each blade on the attachment means and allows for reduced cost and weight.

Still another object of the present invention is to provide the aforesaid improvemments in which a single rigid member extends radially from the central rotor hub to each rotor blade and which provides the droop stop, carries the lead-lag pivot and provides the pitch change attitude for each rotor blade independantly of the other blades.

These and other objects and advantages will become apparent from the following description considered in connection with the accompanying drawings; it being expressly understood, however, that the drawings are for the purpose of illustration and description only, and are not intended as a definition of the limits of the invention.

BRIEF DESCRIPTION OF THE DRAWINGS

FIG. 1 is a fragmentary perspective view illustrating the preferred embodiment of present invention on a rotary wing aircraft and in which parts have been broken away to illustrate structure therebehind.

FIG. 2 is an elevational section taken substantially along the plane of line 2—2 of FIG. 1.

Figure 3:
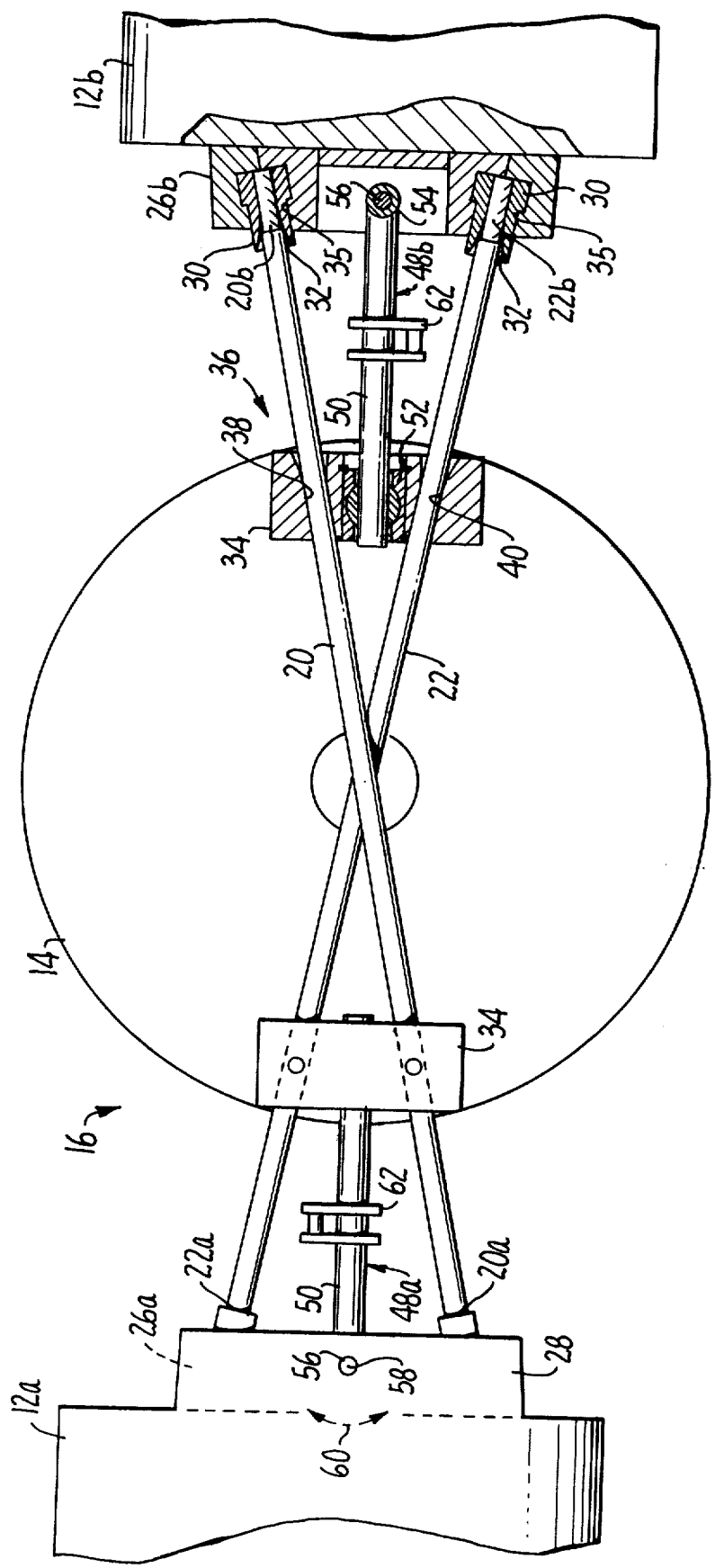
FIG. 3 is a plan view of the device in FIG. 1 with parts in section to illustrate the attachment means between one blade and the hub.

In the drawings there is shown a single pair of rotor blades 12a and 12b in diametrically opposed relation about a central rotor hub 14. While only a single pair of blades is shown it should be noted that other even number blade configurations may be accomodated by increasing the number of attachment and control means 16.

Attachment 16 includes a pair of cable means 20 and 22 having each of their opposite ends 20a, 20b and 22a, 22b attached to an associated pair of rotor blades 12a and 12b. Thus cable ends 20a and 22a are attached to rotor blade 12a while cable ends 20b and 22b are attached to rotor blade 12b. Cables 20 and 22 extend between the rotor blades and longitudinally across rotor hub 14, in overlapping crossing relation.

The cables are formed of spirally twisted multi-stranded cable and are laid between the rotor blades with the strands of one cable of the opposite twist to the strands of the other cable. Preferably the cables are covered between their attached ends with a synthetic resin layer 24 to provide rigidity and to dampen cable vibration.

The cables are attached to the blades through a pair of first fixture means 26a and 26b. Fixture means 26a and 26b are carried at the inner ends of blades 12a and 12b respectively and rigidly attach the cable ends 20a, 22a and 20b, 22b in spaced relation along the inner ends of the rotor blades. Each of the fixture means is rigidly attached to its associated blade by longitudinally extending plates 28 at the upper and lower sides of each blade.

As was disclosed in the aforementioned patent the ends of each cable carries a swagged fitting 30 for better anchoring of the cable ends. These fittings are relieved at their inner ends with a large radius chamfer 32 to eliminate fatigue at the flexing point of the cable. Fixture means 26 includes sockets 35 to securely hold the attached swagged fitting 30 of each cable end. The sockets are aligned along a diametric line of the rotor hub, that is the axis of the sockets converge at the center of the hub such that the cables will be in a straight line between the rotor blades.

A second fixture means 36 is attached to the rotor hub 14 and supports and carries the cables 20 and 22 on the rotor hub so that the blades 12 may move relative to the hub while the cables transmit the radial load between the opposed pair of blades. The term "radial load" is used to define the forces that would normally be subjected to the cable end fittings secured to the rotor hub in the aforementioned patent. Fixture means 36 has a pair of spaced throughbores 38, 40 through which cables 20 and 22 pass. Throughbores 38, 40 of the fixture 36 are displaced vertically from one another and have their axis converge similar to sockets 35 such to allow the cables to lie in straight lines displaced along the axis of rotation of the hub. Thus the ends 20a, 22a and 20b, 22b of the respective cables 20 and 22 intersect the respective rotor blades 12a and 12b along a line 42 lying along the pitch plane of each blade. This sets the nominal pitch of the blade and also prevents the crossing cables from bending or rubbing.

Fixture means 36 is preferably a pair of fixture supports 34 secured at the outer edges of the rotor hub 14 adjacent each associated rotor blade.

The blades 12a and 12b are supported by a pair of rigid pitch control members 48a and 48b rotatably carried between the rotor hub and the inner end of each rotor blade centrally of the cable ends. Each pitch control member 48 controls the pitch of its associated blade and also acts as the droop stop for that blade. Member 48 is in the form of a tube 50 carried slidably in ball bushing 52 in each of the fixture supports 34. The outer end of tube 50 carries a transverse extension 54 having a transverse bearing mount carrying pin 56.

Pin 56 is secured in plates 28 at the inner ends of the rotor blades and allows the blade to pivot about axis 58 in the lead and lag directions as defined by arrow 60.

Means 62 are carried on each of the pitch control tubes 50 for rotating the pitch control members and selectively change the pitch or angle of attack of each blade.

From the foregoing it will be seen that I have provided an improved means for attaching opposed rotor blades to a central rotor hub and which attachment meets the requisite demands of rotary wing aircraft in an efficient and economical way.

I claim:

1. In a rotating wing aircraft having a pair of rotor blades in diametrically opposed relation about a central rotor hub an attachment and control means for said blades and hub comprising,
   - a pair of cable means having each of their opposite ends attached to an associated pair of diametrically opposed rotor blades and extending longitudinally across the rotor hub in overlapping crossing relation,
   - a pair of first fixture means carried at the inner end of each of the rotor blades for rigidly attaching the respective cable ends in spaced relation along the inner ends of the rotor blades,
   - a second fixture means attached to the central rotor hub for supporting and carrying the cables on said rotor hub such that the blades may move relative to the hub while the cables transmit the radial load between the opposed pair of blades,
   - a pair of pitch control members rotatably carried between the rotor hub and the inner end of each rotor blade centrally of the cable ends,
   - means for rotating the pitch control members to selectively change the pitch of each blade.

2. The blade and hub attachment device for rotary wing aircraft as defined in claim 1 and wherein each of the cables of the pair of cable means are further defined as extending diametrically across the rotor hub and further defined as displaced along the axis of rotation of the hub from one another such that the respective cable ends intersect the respective rotor blades along a line lying along the nominal pitch plane of each blade.

3. The blade and hub attachment device for rotary wing aircraft as defined in claim 1 and wherein each of said cables of the pair of cable means is formed of spirally twisted multi-stranded cable and is laid in a straight line between the rotor blades such that the strands of one of the cable pair are of an opposite twist to the strands of the other cable, or each cable is nonrotating, and the cables are further covered with a synthetic resin layer between the attached ends thereof to provide a vibration dampening cover.

4. The device as defined in claim 1 and wherein each of the cable ends of the pair of cable means is securely carried in a swagged fitting having a radius relief chamfer of its inner end to eliminate fatigue in the cables, and wherein said first fixture means has a socket for accepting said swagged fitting to securely attach the cable end to the rotor blade with the socket aligned along a diametric line of the hub.

5. The device as defined in claim 1 and wherein said second fixture means includes a pair of fixture supports secured at the outer edges of the rotor hub adjacent each rotor blade and each support having spaced throughbores for accepting said pairs of cable means with a ball bushing therebetween for supporting the pitch control member of the associated rotor blade.

6. The device as defined in claim 1 and wherein, each of the pairs of pitch control members is carried on the inner end of its associated rotor blade through a transverse rotary bearing mount to allow the blade to pivot in the lead and lag directions.

7. The device as defined in claim 6 and wherein the pitch control member acts as a rotor blade droop stop.

* * * * *